3,150,204
PRODUCTION OF ISOPARAFFINS
James R. Lawley, Jr., Oral C. Behymer, Edward F. Wadley, Henry G. Schutze, and Richard S. Manne, all of Baytown, Tex., assignors, by mesne assignments, to Esso Research and Engineering Company, Elizabeth, N.J., a corporation of Delaware
Filed Sept. 29, 1961, Ser. No. 141,801
10 Claims. (Cl. 260—683.59)

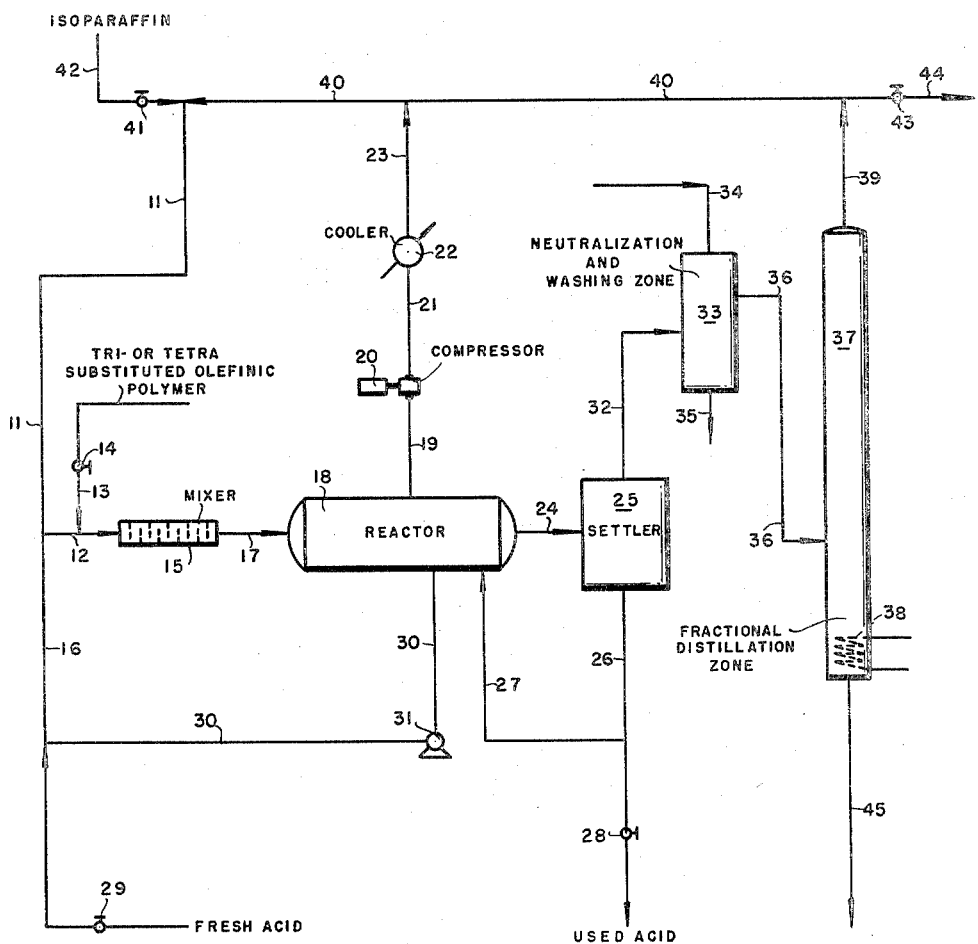

The present invention is directed to a method for producing paraffins. More particularly, the invention is concerned with the production of isoparaffins. In its more specific aspects, the invention is concerned with producing heavy isoparaffins by condensing a lighter isoparaffin with itself and by saturating a heavy polymer simultaneously in the presence of an acid catalyst.

The present invention may be briefly described as a method for producing heavy paraffins, such as isoparaffins, by contacting with an acid catalyst a mixture of an isoparaffin having 4 to 6 carbon atoms in the molecule and an olefinic hydrocarbon having 3 to 4 alkyl groups on the carbon atoms between which lies the double bond and having 5 to 20 carbon atoms in the molecule at a reaction temperature sufficient to condense the isoparaffin and to saturate the olefin. The reaction is conducted in the liquid phase with the isoparaffin and olefin being present in the mixture in a volume ratio within the range from about 3 to about 10 to 1 to produce the desired product which results from condensing the isoparaffin with itself and by saturating the olefin.

The isoparaffins which may be used in the practice of the present invention are suitably isobutane, isopentane, and the several isohexanes. In short, the isoparaffins have 4 to 6 carbon atoms in the molecule.

The olefins employed in the practice of the present invention are the tri- or tetra-substituted olefins and the heavy olefinic polymers which have 3 to 4 alkyl groups on the carbon atoms between which lies the double bond. The olefins may suitably have 5 to 20 carbon atoms in the molecule and may be polymer of a lower molecular weight olefin. The most desirable polymer feed stocks have 9 to 20 carbon atoms in the molecule and suitably may be polymers of the butylenes, such as iso- and n-butylenes, propylene, pentylenes, and the several hexylenes or mixture thereof. Specific olefins useful in the present invention includes, by way of illustration, 2-methyl butene-2; 2,3-dimethyl butene-2; 2-methyl pentene-2; 2-methyl hexene; 2; 2,3-dimethyl pentene-2; 3-methyl hexene-3; 2-methyl heptene-2; 2,3-dimethyl hexene-2; 3-methyl heptene-3; 3,4-dimethyl hexene-3; diisobutylene; triisobutylene; tetraisobutylene; tripropylene; tetrapropylene; the higher polymers of propylene satisfying the tri- or tetra-substituted requirement on the carbon atoms between which lies the double bond; copolymers of propylene and butylenes having 9 to 20 carbon atoms in the molecule, and the like. It will be preferred to employ an isoparaffin, such as isobutane, and a polymer, such as tetrapropylene, which has 12 carbon atoms in the molecule.

The reaction is suitably conducted at a temperature within the range from about 20° to about 100° F. with a preferred temperature range (particularly, when isobutane and tetrapropylene are employed) within the range from about 30° to 50° F.

A pressure at the temperatures given sufficient to maintain the reactants in the liquid sufficient to maintain the reactants in the liquid phase is employed.

The catalyst which may be employed in the practice of the present invention is any suitable acid catalyst such as, but not limited to, sulfuric acid having a strength within the range from 85% to 100% $H_2SO_4$, hydrogen fluoride and aluminum chloride in the form of a liquid sludge resulting from reacting the aluminum chloride with the hydrocarbon reactants. It will be preferred, however, to use sulfuric acid of a strength within the range given and when isobutane and tetrapropylene are the feed stock, it will be preferred to employ sulfuric acid having a strength within the range from about 90–95% $H_2SO_4$.

The isoparaffin and polymer are present in the mixture in a volume ratio within the range from about 3 to 1 to about 25 to 1 with a preferred volume ratio from about 5 to 1 to about 15 to 1.

The present invention will be described by reference to the drawing in which the single figure is a flow diagram of a preferred mode.

Referring now to the drawing, numeral 11 designates a charge line by way of which an isoparaffin, such as isobutane and the like, are introduced into the system from a source which will be described further hereinafter. The isoparaffin in line 11 discharges into line 12 wherein there is added thereto by line 13, controlled by valve 14, a tri- or tetra-substituted olefinic polymer, such as tetrapropylene and the like. The isoparaffin and polymer are discharged by way of line 12 into a mixing zone 15, which is illustrated as a baffle-type mixing device, but which may be any mixing apparatus, such as a contacting tower, a pump, an orifice mixer, and the like. Introduced also into line 12 by way of line 16 is an acid catalyst such as sulfuric acid which flows into line 12 and into mixing zone 15 wherein the hydrocarbons and acid are intimately contacted and mixed. The acid and hydrocarbon mixture in the form of an emulsion is then discharged by way of line 17 into a reaction zone 18 which is of suitable dimensions and capacity to allow a sufficient contact between the hydrocarbons and the acid catalyst to allow the reaction to go to completion. It may be preferred, however, to have the mixing zone as an integral part of the reactor. Thus, the reaction zone 18 may be divided into sections with each section provided with a motor driven impeller to achieve good mixing. Ordinarily, this constitutes a space velocity of 0.02 to 0.3 volume of olefinic polymer per volume of acid per hour and a concentration of 0.02 to 1.0 volume of olefin per volume of acid per hour multiplied by the square of the volume of isoparaffin to the volume of isoparaffin plus olefin; i.e.

$$\frac{\text{Volume olefin per hour}}{\text{Volume acid}} \left(\frac{\text{volume of isoparaffin}}{\text{volume of isoparaffin} + \text{olefin}}\right)^2$$

The temperature and pressure conditions are provided in zone 18 such that the isoparaffin is condensed with itself and the polymer is saturated.

Since the reaction is exothermic, it is necessary to remove heat of reaction to maintain the temperature within the range from about 20° to about 100° F. To this end, line 19 leads from reaction zone 18 to a compressor 20 which causes evaporation of part of the contents of zone 18 and allows cooling of the contents by autorefrigeration. The compressor 20 discharges by line 21 into a cooler 22 to remove heat from the vapors and allow condensation thereof for discharge by way of line 23.

The acid-hydrocarbon emulsion in zone 18 is discharged therefrom by line 24 which leads into a settling zone 25 which is of sufficient capacity to provide a residence time sufficient for separation of the emulsion into a hydrocarbon phase and an acid phase. The acid phase is discharged by line 26 and may be recycled to zone 18 by line 27. Preferably, a part of the acid catalyst in line 26 is discharged from the system by manipulating valve 28. When used acid is discharged by line 26, a sufficient amount of fresh acid is introduced into line 16 to maintain the acid strength within the range indicated. This is accomplished by opening valve 29 connecting line 16 to a suitable source of fresh acid catalyst.

In order to operate efficiently, it is desirable to recycle a portion of the hydrocarbon-acid emulsion in zone 18 through the mixing zone 15. To this end, line 30, containing a pump 31, leads from zone 18 to line 16.

The hydrocarbon phase separated from the acid in zone 25 is withdrawn therefrom by line 32 and discharged into a neutralizing and washing zone 33 which is shown as a block in the diagram. Line 34 leads into zone 33 and line 35 discharges therefrom. It is to be understood that zone 33 will include caustic and water washing facilities to neutralize any acidity which is carried over with the hydrocarbon phase withdrawn by line 32 from zone 25. The neutralized and washed hydrocarbon from zone 33 is then introduced by line 36 into a separation zone 37, which is suitably a fractional distillation zone which may include a plurality of fractional distillation towers of the modern type suitably equipped with internal vapor-liquid contacting means, means for inducing reflux, cooling and condensing means, and the like. Zone 37 is provided with a heating means illustrated by steam coil 38, but which suitably may be an external reboiler as may be desired. Zone 37 is provided with line 39 for removal of light isoparaffins and any other light products therefrom for recycle to line 11 by way of line 40. It is to be noted that line 33 discharges into line 40 to recycle the isoparaffin or isobutane withdrawn by line 19.

Make-up isoparaffin may be introduced into line 11 by manipulating valve 41 in branch line 42 which connects into line 11. Likewise, excess isoparaffin, such as isobutane, may be discharged from the system by opening valve 43 in branch line 44, as may be desired.

The desired heavy isoparaffins may be withdrawn by line 45 and suitably used as jet fuel, automobile and other motor fuels, specialty oils, and the many other uses to which such isoparaffins may be put.

While it is shown in the drawing that the isoparaffins are withdrawn as a bottoms fraction, it may be preferred to withdraw this material as a distillate fraction and when such is desired, suitable provision may be made in the distillation equipment. Likewise, it may be desirable to separate the product into several fractions. Thus, when the feed is isobutane and tetrapropylene, the product is essentially iso-octane and saturated polymer ($C_{12}$ isoparaffins). It is contemplated that the iso-octane and $C_{12}$ isoparaffins may be separated from each other and separately recovered.

In order to illustrate the invention further, in a continuous operation, a $C_{12}$ fraction of propylene (tetra substituted) formed by phosphoric acid polymerization of propylene at a temperature of about 400° F. having a boiling range of about 365°–395° F. was admixed with 20 volumes of isobutane and subjected to contact with a sulfuric acid catalyst having a strength of 90–92% $H_2SO_4$ at a temperature of 41° F. As a result of this operation, which was conducted in the liquid phase, a product was obtained which was subjected to fractional distillation. In another run, the same polymer fraction was admixed with 8 volumes of isobutane at 47° F. utilizing the same acid catalyst. A similar product resulted illustrating the broad range of isoparaffin to olefin ratio over which the process is operable.

It was found that the products from both runs were essentially iso-octane and $C_{12}$ isoparaffins in about an equal molar ratio. This is indeed surprising and unexpected because ordinarily one would expect from isobutane and tetrapropylene to produce a range of isoparaffins having a wide boiling range. It appears that under the conditions employed, using the particular feed stocks, that the isoparaffin condenses with itself to form iso-octane, while the polymer is saturated to form the $C_{12}$ hydrocarbon. In short, the isoparaffin in admixture with the heavy polymer in the presence of the acid catalyst serves as a hydrogen donor for the olefinic polymer and then the isobutane undergoes condensation to form iso-octane.

In practicing the present invention, it is important that the particular tri- or tetra-substituted olefinic hydrocarbon be employed. If the hydrocarbon is a typical available refinery product such as an olefinic polymer and it is not a tri- or tetra-substituted olefin, the condensation and saturation reactions do not proceed and other reactions are favored. Hence, it is essential in the practice of the present invention that a tri- or tetra-substituted olefinic feed be used. Preferably, a tetra-substituted olefinic polymer is employed.

While it is preferred to employ an olefinic hydrocarbon polymer having 3 to 4 alkyl groups on the carbon atom between which lies the double bond and having 9 to 20 carbon atoms in the molecule for admixture with the isoparaffin, it is possible to employ any olefinic hydrocarbon having 3 to 4 alkyl groups on the carbon atom between which lies the double bond and having 5 to 20 carbon atoms in the molecule as the feed stock. The polymers are available and may be obtained in substantial purity and, therefore, are to be preferred.

The nature and objects of the present invention having been fully described and illustrated and the best mode thereof set forth, what we wish to claim as new and useful and secure by Letters Patent is:

1. A method for producing paraffins which comprises contacting a mixture of an isoparaffin having 4 to 6 carbon atoms in the molecule and an olefinic hydrocarbon having 3 to 4 alkyl groups on the carbon atoms between which lies the double bond and having 5 to 20 carbon atoms in the molecule at a temperature within the range from about 20° to about 100° F. in the liquid phase with sulfuric acid having a strength within the range from about 85% to about 100% $H_2SO_4$, the isoparaffin and olefinic hydrocabron being present in said mixture in a volume ratio within the range from about 3 to about 25 of isoparaffin to 1 of olefinic hydrocarbon, to produce a product containing essentially isoparaffins formed by condensing said isoparaffin in the mixture with itself and by saturating said olefinic hydrocarbon.

2. A method in accordance with claim 1 in which the isoparaffin in the mixture is isobutane.

3. A method in accordance with claim 1 in which the isoparaffin in the mixture is isopentane.

4. A method in accordance with claim 1 in which the isoparaffin in the mixture is isohexane.

5. A method for producing paraffins which comprises contacting a mixture of isobutane and a tetra-substituted olefinic hydrocarbon having 4 alkyl groups on the carbon atoms between which lies the double bond and having 12 carbon atoms in the molecule at a temperature within the frange from about 20° to about 100° F. in the liquid phase with sulfuric acid having a strength within the range from about 85% to about 100% $H_2SO_4$, the isoparaffin and olefinic hydrocarbon being present in said mixture in a volume ratio within the range from about 3 to about 25 of isobutane to 1 of olefinic hydrocarbon, to produce a product containing essentially $C_8$ and $C_{12}$ isoparaffins formed by condensing said isobutane with itself and by saturating said olefinic hydrocarbon.

6. A method for producing paraffins which comprises contacting a mixture of isobutane and a tetra-substituted olefinic hydrocarbon polymer having 4 alkyl groups on the carbon atoms between which lies the double bond and having 12 carbon atoms in the molecule at a temperature within the range from about 30° to about 50° F. in the liquid phase with sulfuric acid having a strength within the range from about 90% to about 95% $H_2SO_4$, the isobutane and polymer being present in said mixture in a volume ratio within the range from about 3 to about 25 of isobutane to 1 of said polymer, to produce a product containing essentially $C_8$ and $C_{12}$ isoparaffins formed by condensing said isobutane with itself and by saturating said polymer.

7. A method in accordance with claim 6 in which the volume ratio is within the range from about 5 to 1 to about 15 to 1.

8. A method for producing paraffins which comprises contacting a mixture of an isoparaffin having 4 to 6 carbon atoms in the molecule and an olefin having 3 to 4 alkyl groups on the carbon atoms between which lies the double bond and having 5 to 20 carbon atoms in the molecule at a reaction temperature sufficient to condense said isoparaffin and to saturate said olefin and in the liquid phase with an acid catalyst, the isoparaffin and olefin being present in said mixture in a volume ratio within the range from about 3 to about 25 of isoparaffin to 1 of olefin to produce a product containing essentially isoparaffins formed by condensing said isoparaffin in the mixture with itself and by saturating said olefin.

9. A method for producing paraffins which comprises contacting a mixture of an isoparaffin having 4 to 6 carbon atoms in the molecule and an olefin having 3 to 4 alkyl groups on the carbon atoms between which lies the double bond and having 5 to 20 carbon atoms in the molecule at a temperature within the range from about 20° to about 100° F. in the liquid phase with an acid catalyst, the isoparaffin and olefin being present in said mixture in a volume ratio within the range from about 3 to about 25 of isoparaffin to 1 of olefin to produce a product containing essentially isoparaffins formed by condensing said isoparaffin in the mixture with itself and by saturating said olefin.

10. A method for producing iso-octane which comprises contacting a mixture of isobutane and a tetra-substituted olefinic hydrocarbon having 4 alkyl groups on the carbon atoms between which lies the double bond and having 12 carbon atoms in the molecule at a temperature within the range from about 30° to about 50° F. in the liquid phase with sulfuric acid having a strength within the range from about 90% to about 95% $H_2SO_4$, the isobutane and olefinic hydrocarbon being present in said mixture in a volume ratio from about 5 of isobutane to 1 of olefinic hydrocarbon to 15 of isobutane to 1 of olefinic hydrocarbon to produce a product containing essentially iso-octane and $C_{12}$ isoparaffins, and recovering iso-octane from said product.

References Cited in the file of this patent

UNITED STATES PATENTS

| 2,359,119 | Karr et al. | Sept. 26, 1944 |
| 2,505,644 | McAllister et al. | Apr. 25, 1950 |